US012656238B2

(12) United States Patent
Ozcan et al.

(10) Patent No.: US 12,656,238 B2
(45) Date of Patent: Jun. 16, 2026

(54) VIRTUAL IMPACTOR-BASED LABEL-FREE PARTICULATE MATTER DETECTION USING HOLOGRAPHY AND DEEP LEARNING

(71) Applicant: THE REGENTS OF THE UNIVERSITY OF CALIFORNIA, Oakland, CA (US)

(72) Inventors: Aydogan Ozcan, Los Angeles, CA (US); Yi Luo, Los Angeles, CA (US); Tairan Liu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 19/103,828

(22) PCT Filed: Aug. 28, 2023

(86) PCT No.: PCT/US2023/073028
§ 371 (c)(1),
(2) Date: Feb. 14, 2025

(87) PCT Pub. No.: WO2024/050321
PCT Pub. Date: Mar. 7, 2024

(65) Prior Publication Data
US 2026/0086013 A1 Mar. 26, 2026

Related U.S. Application Data

(60) Provisional application No. 63/373,845, filed on Aug. 29, 2022.

(51) Int. Cl.
*G01N 15/0227* (2024.01)
*G03H 1/00* (2006.01)
(Continued)

(52) U.S. Cl.
CPC ....... *G01N 15/0227* (2013.01); *G03H 1/0005* (2013.01); *G03H 1/0443* (2013.01);
(Continued)

(58) Field of Classification Search
CPC .... G01N 15/0227; G06V 20/52; G06V 10/82; G06V 10/147; G06V 10/764; G03H 1/0005; G03H 1/0443; G03H 1/0465
See application file for complete search history.

(56) References Cited

U.S. PATENT DOCUMENTS

| | | | |
|---|---|---|---|
| 8,791,985 B2 * | 7/2014 | Grier ................. | G01B 9/02001 |
| | | | 356/336 |
| 8,842,901 B2 | 9/2014 | Ozcan et al. | |

(Continued)

FOREIGN PATENT DOCUMENTS

WO WO 2016019324 A2 2/2016

OTHER PUBLICATIONS

PCT International Search Report and Written Opinion for PCT/US2023/073028, dated Jan. 12, 2024 (7 pages).
(Continued)

*Primary Examiner* — Mishawn N. Hunter
(74) *Attorney, Agent, or Firm* — VISTA IP LAW GROUP LLP

(57) ABSTRACT

A particulate matter detection device takes holographic images of flowing particulate matter concentrated by a virtual impactor, which selectively slows down and guides larger particles to fly through an imaging window. The flowing particles are illuminated by a pulsed laser diode, casting their inline holograms on a CMOS image sensor in a lens-free mobile imaging device. The illumination contains three short pulses with a negligible shift of the flowing particle within one pulse and triplicate holograms of the same particle are recorded at a single frame revealing
(Continued)

different perspectives of each particle. A deep neural network classifies the particles based on the acquired holographic images. The device was tested using different types of pollen and achieved a blind classification accuracy of 92.91%. This mobile and cost-effective device weighs ~700 g and can be used for label-free sensing and quantification of various bio-aerosols over extended periods.

21 Claims, 9 Drawing Sheets

(51) Int. Cl.

| | |
|---|---|
| *G03H 1/04* | (2006.01) |
| *G06V 10/147* | (2022.01) |
| *G06V 10/764* | (2022.01) |
| *G06V 10/82* | (2022.01) |
| *G06V 20/52* | (2022.01) |

(52) U.S. Cl.
CPC ......... *G03H 1/0465* (2013.01); *G06V 10/147* (2022.01); *G06V 10/764* (2022.01); *G06V 10/82* (2022.01); *G06V 20/52* (2022.01); *G01N 2015/0233* (2013.01); *G03H 2001/005* (2013.01); *G03H 2001/0447* (2013.01); *G03H 2001/0467* (2013.01); *G03H 2210/55* (2013.01); *G03H 2210/62* (2013.01); *G03H 2222/12* (2013.01); *G03H 2226/02* (2013.01); *G03H 2226/11* (2013.01)

(56) References Cited

U.S. PATENT DOCUMENTS

| | | | | |
|---|---|---|---|---|
| 8,916,390 | B2 | 12/2014 | Ozcan et al. | |
| 9,007,433 | B2 | 4/2015 | Ozcan et al. | |
| 9,057,702 | B2 | 6/2015 | Ozcan et al. | |
| 9,715,099 | B2 | 7/2017 | Ozcan et al. | |
| 10,365,214 | B2 | 7/2019 | Ozcan et al. | |
| 10,895,843 | B2 * | 1/2021 | Hong | G03H 1/0443 |
| 11,054,357 | B2 | 7/2021 | Ozcan et al. | |
| 11,450,121 | B2 | 9/2022 | Ozcan et al. | |
| 11,893,779 | B2 | 2/2024 | Ozcan et al. | |
| 2014/0120563 | A1 | 5/2014 | Ozcan et al. | |
| 2016/0320602 | A1 * | 11/2016 | Kazemzadeh | G02B 21/365 |
| 2017/0153106 | A1 * | 6/2017 | Ozcan | G03H 1/02 |
| 2018/0052425 | A1 * | 2/2018 | Ozcan | G03H 1/0866 |
| 2018/0252628 | A1 * | 9/2018 | Ruffner | G01N 15/0227 |
| 2019/0011882 | A1 | 1/2019 | Gusyatin | |
| 2020/0284710 | A1 * | 9/2020 | Occhipinti | G01N 15/0272 |
| 2020/0319082 | A1 * | 10/2020 | Mutlu | G01P 5/001 |
| 2020/0340901 | A1 | 10/2020 | Ozcan et al. | |
| 2021/0209337 | A1 | 7/2021 | Ozcan et al. | |

OTHER PUBLICATIONS

George Barbastathis et al., On the use of deep learning for computation imaging, Optica, vol. 6, No. 8, Aug. 2019, 921-943.

Wermer Bergman et al., High air flow, low pressure drop, bio-aerosol collector using a multi-slit virtual impactor, Journal of Aerosol Science, May 2005.

Waheb Bishara et al., Lensfree on-chip microscopy over a wide field-of-view using pixel super-resolution, Optics Express, May 24, 2010, vol. 18, No. 11, 11181-11191.

Zoltan Gorocs et al., A deep learning-enabled portable imaging flow cytometer for cost-effective, high-throughput, and label-free analysis of natural water samples, Light Science & Applications (2018)7:66 (12 pages).

Alon Greenbaum et al., Imaging without lenses: achievements and remaining challenges of wide-field on-chip microscopy, Nat Methods, Sep. 2012, 9(9):889-895.

Onur Mudanyali et al., Compact, Light-weight and Cost-effective Microscope based on Lensless Incoherent Holography for Telemedicine Applications, Lab Chip, Jun. 7, 2010; 10(11):1417-1428.

Ali Mohamadi Nasrabadi et al., Assessment of indoor bioaerosols using a lab-made virtual impactor, (2016), Aerosol Science and Technology, DOI:10.1080/02786826.2016.1246707.

Yair Rivenson et al., Deep learning in holography and coherent imaging, Light: Science & Applications (2019)8:85, https//doi.org/10.1038/s41377-019-0196-0.

Sungkyu Seo et al., Lensfree holographic imaging for on-chip cytometry and diagnostics, Lab on a Chip, 2009, 9, 777-787.

Derek Tseng et al., Lensfree microscopy on a cellphone, Lab Chip, Jul. 21, 2010; 10(14):1787-1792.

Yi-Chen Wu et al., Air quality monitoring using mobile microscopy and machine learning, Light: Science & Applications (2017) 6, e17046.

Yichen Wu et al., Label-Free Bioaerosol Sensing Using Mobile Microscopy and Deep Learning, ACS Photonics, 2018, 5, 4617-4627.

Zhenqiang Xu et al., Bioaerosol Science, Technology, and Engineering: Past, Present, and Future, Aerosol Science and Technology, 45:1337-1349 (2011).

Yibo Zhang et al., Edge sparsity criterion for robust holographic autofocusing, Optics Letters, vol. 42, No. 19, Oct. 1, 2017, 3824-3827.

* cited by examiner

1

VIRTUAL IMPACTOR-BASED LABEL-FREE PARTICULATE MATTER DETECTION USING HOLOGRAPHY AND DEEP LEARNING

RELATED APPLICATION

This Application is a U.S. National Stage filing under 35 U.S.C. § 371 of International Application No. PCT/US2023/073028, filed on Aug. 28, 2023, which claims priority to U.S. Provisional Patent Application No. 63/373,845 filed on Aug. 29, 2022, which is hereby incorporated by reference. Priority is claimed pursuant to 35 U.S.C. §§ 119, 371 and any other applicable statute.

TECHNICAL FIELD

The technical field generally relates to sensors for the detecting and analyzing bio-aerosols and other particulate matter. More specifically, the technical field relates to a field-portable bio-aerosol monitoring device that integrates aerosol sampling and inspection.

BACKGROUND

Bio-aerosols account for 5-34% of indoor particulate matter (PM). They are airborne microparticles originating from plants, animals, and living or dead microorganisms. Bio-aerosols can easily enter the respiratory tract during inhalation due to their microscopic size. Exposure to bio-aerosols has been related to a wide range of health issues. Some bio-aerosols cause irritation and allergic reactions, such as pollen; some others, like fungal and bacterial PM, can spread infectious and respiratory diseases. For example, bio-aerosols served as an important transmission route during the COVID-19 pandemic. They may also lead to an increased risk of cancer. Conventional sensing of bio-aerosols includes two steps: the aerosols are first sampled using, e.g., an impinger, a cyclone, an impactor, or a filter, and then analyzed in a central lab under a microscope with fluorescence labeling or through a culture-based procedure by a microbiology expert. Other technologies, such as polymerase chain reaction (PCR) and enzyme-linked immunosorbent assays (ELISA), are also applied to better identify the captured bio-aerosols with high sensitivity and specificity. However, the complicated procedures and the need for well-trained experts hinder their widespread use for continuous monitoring of human exposure to bio-aerosols.

For field-portable bio-aerosol monitoring devices that integrate aerosol sampling and inspection, a major challenge is identifying the collected particles. Most devices avoid this challenge by selectively sampling a few types of bio-aerosols using specific antibodies. This antibody-antigen specific reaction can be sensed using different mechanisms, such as lateral flow-based immunoassays, vibrational cantilevers, surface plasmon resonance-based sensors, or Raman spectroscopy. However, the immunoreaction limits the collection efficiency and throughput of the device, and non-specific binding events can cause false-positive detections. Also, the utilization of antibodies creates storage and shelf-life-time issues for these sensors, and it lacks scalability to cover a larger variety of bio-aerosols that might be present in different parts of the world during different seasons. In another embodiment, analyzing the autofluorescence signals of individual bio-aerosols excited by ultraviolet (UV) light was utilized as a label-free method for bio-aerosol detection, but this approach suffered from low specificity due to the insufficient information provided by the weak autofluorescence signals. As an alternative approach, a field-portable, cost-effective platform for high-throughput quantification of aerosols using mobile microscopy was also reported. See Wu, Y. et al., Label-Free Bioaerosol Sensing Using Mobile Microscopy and Deep Learning. ACS Photonics 2018, 5 (11), 4617-4627. This device incorporates an impaction-based aerosol sampling method: a high-speed airstream carries particles moving from the impactor nozzle to a transparent polymer substrate that faces the inlet flow direction. Large aerosols detach from the streamline due to their inertia and are physically collected/captured by the substrate. However, the transparent impactor used for particle collection in this platform suffers from an overfill of the sampling substrate: excessive particles captured on the polymer substrate occlude the imaging field-of-view, preventing new particles from being detected. Therefore, the impactor cartridge must be frequently replaced, which makes the platform inadequate for long-term unsupervised operation.

A good substitution for a physical impactor can be a virtual impactor, which replaces the collection substrate of an impactor with a main channel (a collection probe), where only a minor portion of the input flow will go through. Most of the input air leaves the device via bypass channels, leading to a sharp flow direction change, where large particles detach from the major streamline and enter the main channel, as their greater inertia prevents them from following the drastic flow direction change. Consequently, particles are separated based on their inertia, and large ones are concentrated inside the main channel. Virtual impactors have been widely implemented for ambient fine particle sensing, especially monitoring PM in air. Recent efforts have also utilized this platform for bio-aerosol detection in indoor environments. However, to classify the type of the collected particles for bio-aerosol sensing, the airflow from the main channel needs to go through a filtration step, where the flowing bio-aerosols are transferred to a physical filter or a bio-aerosol collector (an impinger). See Nasrabadi, A. M. et al., Assessment of Indoor Bioaerosols Using a Lab-Made Virtual Impactor, Aerosol Science and Technology 2017, 51 (2), 159-167 and Bergman, W. et al., High Air Flow, Low Pressure Drop, Bio-Aerosol Collector Using a Multi-Slit Virtual Impactor, Journal of Aerosol Science 2005, 36 (5), 619-638. Further analytical examination steps, such as culturing and PCR analysis, are applied to reveal the species of the collected bio-aerosols.

SUMMARY

Here, a virtual impactor-based, cartridge-free or filter-free particulate matter detection device and method are disclosed that combines computational imaging and deep learning to sense and classify bio-aerosols without any external labels or chemical sample processing steps. In this mobile and cost-effective device, a virtual impactor was designed and 3D printed to concentrate the flowing particles larger than ~6 $\mu$m, which covers the size range of most pollen species. An imaging window with a sensing volume of 25 mm$^3$ was placed on the main channel of the virtual impactor (imaging window may have a sensing volume $\geq$30 mm$^3$), and inline lens-free holography was used to image the passing-by particles, owing to its capability of recording volumetric information with a large field-of-view. Coherent illumination from a laser diode shined through the imaging window, forming inline holograms on a complementary metal-oxide semiconductor (CMOS) image sensor placed on the other side, right next to the imaging window. Three illumination pulses were fired during each frame, casting three different holographic images of each particle-all captured at the same frame. With each illumination pulse, a clear lens-free hologram of the particle that is free from motion blur and rolling shutter artifacts was captured by the CMOS image sensor. After three pulses, the CMOS image sensor integrated all three holograms of the same particle at three different lateral locations, forming a unique triplicate holographic pattern per flowing particle. The particles are localized by a differential detection algorithm, and a trained deep neural network was used to classify the pollen type of each particle from its auto-focused holograms. As a demonstration of this mobile and cost-effective system, aerosols of six different types of pollen were imaged: bermuda, elm, oak, pine, sycamore and wheat, which are widespread in North America and Europe. With the triplicate holographic patterns per particle, a majority voting was applied to the classification decision of each particle, achieving a pollen classification accuracy of 92.91%.

It is believed that this is the first demonstration of an imaging-based virtual impactor design that enables label-free particulate matter detection using neural networks, without the need for any filtration or chemical processing. This device is compact, cost-effective and light-weight (~700 g) and since it does not require a cartridge or filter for bio-aerosol sensing, it enables air quality monitoring over an extended period of time without any supervision. This AI-based particulate matter detection and classification device provides a unique solution to indoor air quality monitoring and label-free bio-aerosol sensing.

In one embodiment, a particulate matter detection device includes an air sampler having an inlet for receiving air having particles therein and includes a virtual impactor that includes a main channel intersecting with one or more bypass channels, wherein the main channel includes an optically transparent imaging window; a pulsed light source disposed on a first side of the imaging window; an image sensor disposed on a second, opposing side of the imaging window. The image sensor captures holographic image(s) of the particles passing through the imaging window, wherein each holographic image contains one or more holograms cast by the particles at different times in response to one or more pulses of the light source. In a preferred embodiment, a plurality of pulses are used and an image frame acquired captures holographic images of the particle(s) at each pulse. A computing device with image processing software reconstructs the holographic image(s) into one or more focused image(s) and optional defocused image(s) which are then input to a trained neural network to classify the particles in to one or more classes. The classes may include particle types or, in the case of pollen, pollen classes or types.

In another embodiment, a method of using the particulate matter detection device includes pulling air having particles therein into the inlet of the air sampler and capturing holographic image(s) of the particles passing through the imaging window with one or more pulses of light. The holographic image(s) of the particles passing through the imaging window are then classified with the trained neural network.

In another embodiment, a method of classifying particulate matter particles in air includes flowing the air containing particles into an air sampler having an inlet and having a virtual impactor that includes a main channel intersecting with one or more bypass channels, wherein the main channel includes an optically transparent imaging window. Holographic image(s) of the particles passing through the image window are captured in the main channel with an image sensor disposed adjacent to the imaging window, wherein each holographic image contains one or more holograms cast by the particles at different times in response to pulses of light from a pulsed light source. The holographic image(s) are reconstructed into corresponding focused image(s) with image processing software and the focused image(s) are input to a trained neural network configured to classify the particles passing through the imaging window into one or more classes (e.g., class or type of particle). Defocused image(s) may also be input to the trained neural network as part of the classification operation.

DETAILED DESCRIPTION OF ILLUSTRATED EMBODIMENTS

Figures 1A, 1B, 1C:
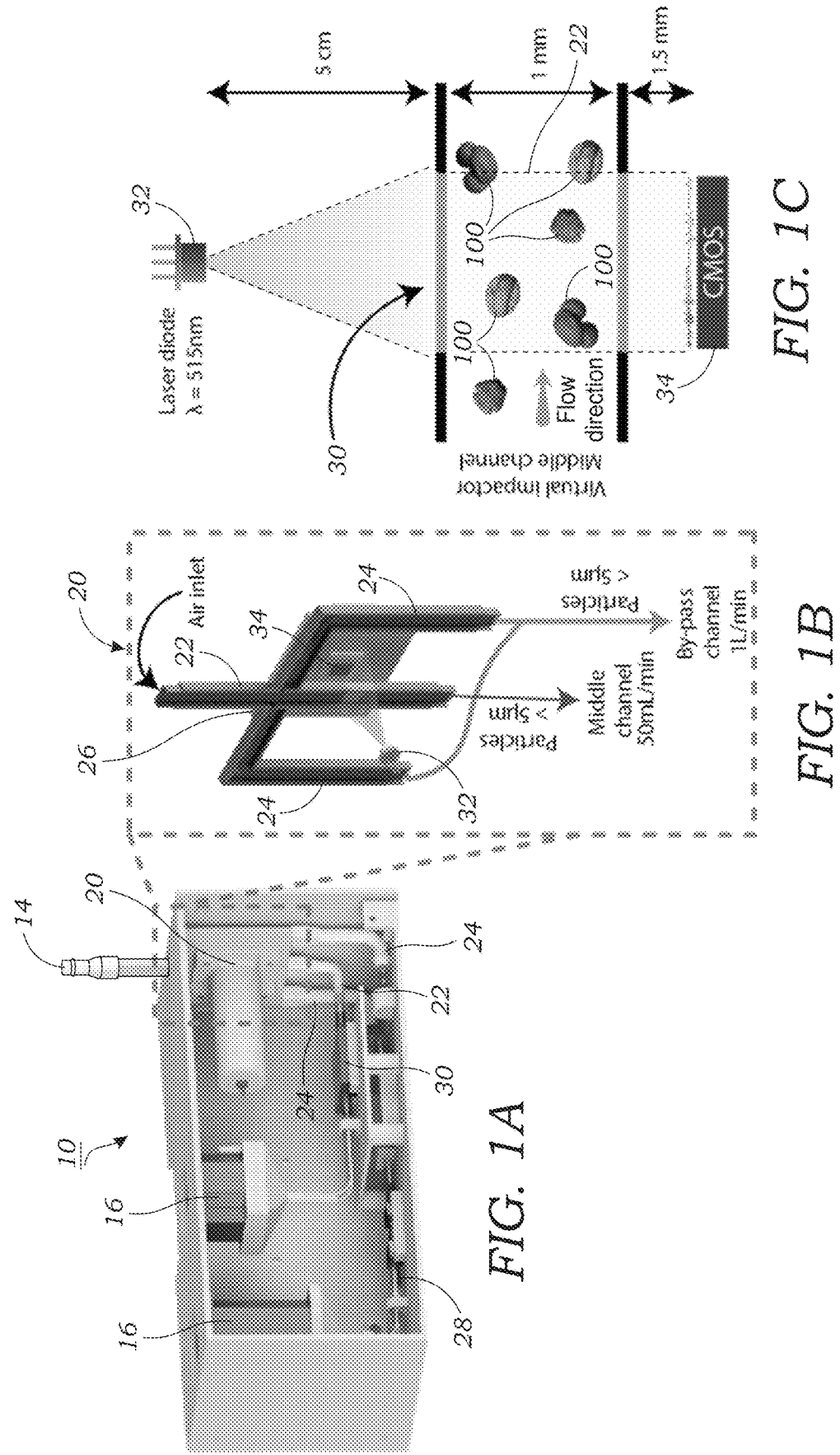
FIG. 1A illustrates a 3D computer-aided-design (CAD) drawing of the device.
FIG. 1B schematically illustrates virtual impactor which is also seen in FIG. 1A (highlighted by dashed rectangle) which includes the main (middle channel) and two side branch channels. The imaging window is seen in the main channel with a pulsed light source and image sensor disposed on opposing sides of the main channel. In this embodiment, particles having sizes exceeding 5 μm enter the main channel while smaller particles are diverted into the branch channels.
FIG. 1C is a schematic illustration of the lens-free imaging system which images particle(s) passing through the imaging window in the main channel. A laser diode illuminated the particles flying through the imaging window with pulsed illumination which his captured by a CMOS image sensor.
Figures 2A, 2B:
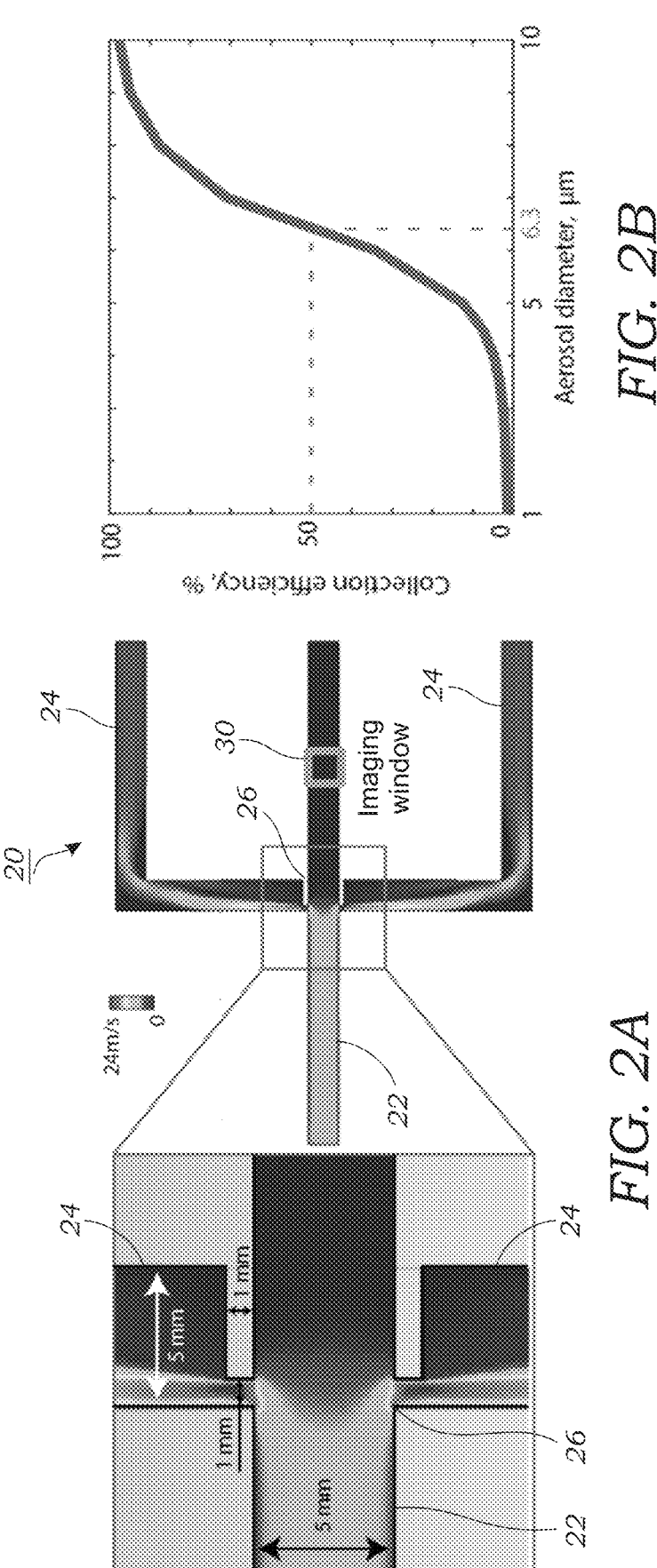
FIG. 2A illustrates the flow field inside the main and bypass channels of the virtual impactor. The geometrical design of the virtual impactor used to concentrate bio-aerosols was optimized using FEM simulations. The intersection of the main channel and bypass channels is also seen in an enlarged view (expanded region). Dimensions are for illustration.
FIG. 2B illustrates a graph showing simulated particle collection efficiency as a function of particle diameter in the main channel of the virtual impactor. At a particle diameter of around 6.3 μm a collection efficiency of 50% is achieved.

In one embodiment, and with reference to FIGS. 1A-IE, a particulate matter particle detection device 10 is disclosed that includes an air sampler 12 having an inlet 14 for receiving air having particles 100 therein. The air sampler 12, as explained herein, pulls air into the inlet 14 via a pair of fans 16. The air sampler 12 and pair of fans 16 are contained in a housing 18. The particles 100 are entrained in the air and flow into the air sampler 12. The particles 100 may include a number of types of particulate matter. This may include bio-aerosols but may also include other non-biological types of particulate matter. This may include organic or inorganic particles. Examples include, by way of illustration and not limitation, molds, pollens, microplastics, and other pollutants. The air sampler 12 includes a virtual impactor 20 that serves as a flow path for the air entering the inlet 14 of the air sampler 12. The virtual impactor 20 is formed from main channel 22 (e.g., middle channel in this embodiment) that communicates with the inlet 14. This main channel 22 is the channel that contains particles 100 having a size above a certain size or diameter. For example, the particulate matter particle detection device 10 described herein was designed so that particles 100 having diameters larger than 6 $\mu$m passed from the inlet 14 and into the main channel 22. One or more bypass channels 24 intersect with the main channel 22 at a junction 26. In one specific implantation, and with reference to FIGS. 1B, 2A and 2C, there is a first bypass channel 24 and a second bypass channel 24 located at the junction 26. As seen in FIGS. 1B and 2A, the first bypass channel 24 and the second bypass channel 24 intersect with the main channel 22 in a generally orthogonal arrangement. In addition, at the junction 26 of the first and second bypass channels 24 with the main channel 22, the first and second bypass channels 24 have a reduced width. For example, as seen in FIG. 2A, the width of the main channel 22 is 5 mm. The first and second bypass channels 24 also have a width of 5 mm except for the point where the first and second bypass channels 24 intersect with the main channel 22. As seen in FIG. 2A, with respective widths of the first and second bypass channels 24 narrows to 1 mm. This narrow 1 mm channel extends for 1 mm where it transitions to first and second bypass channels 24 having widths of 5 mm.

Figures 1D, 1E:
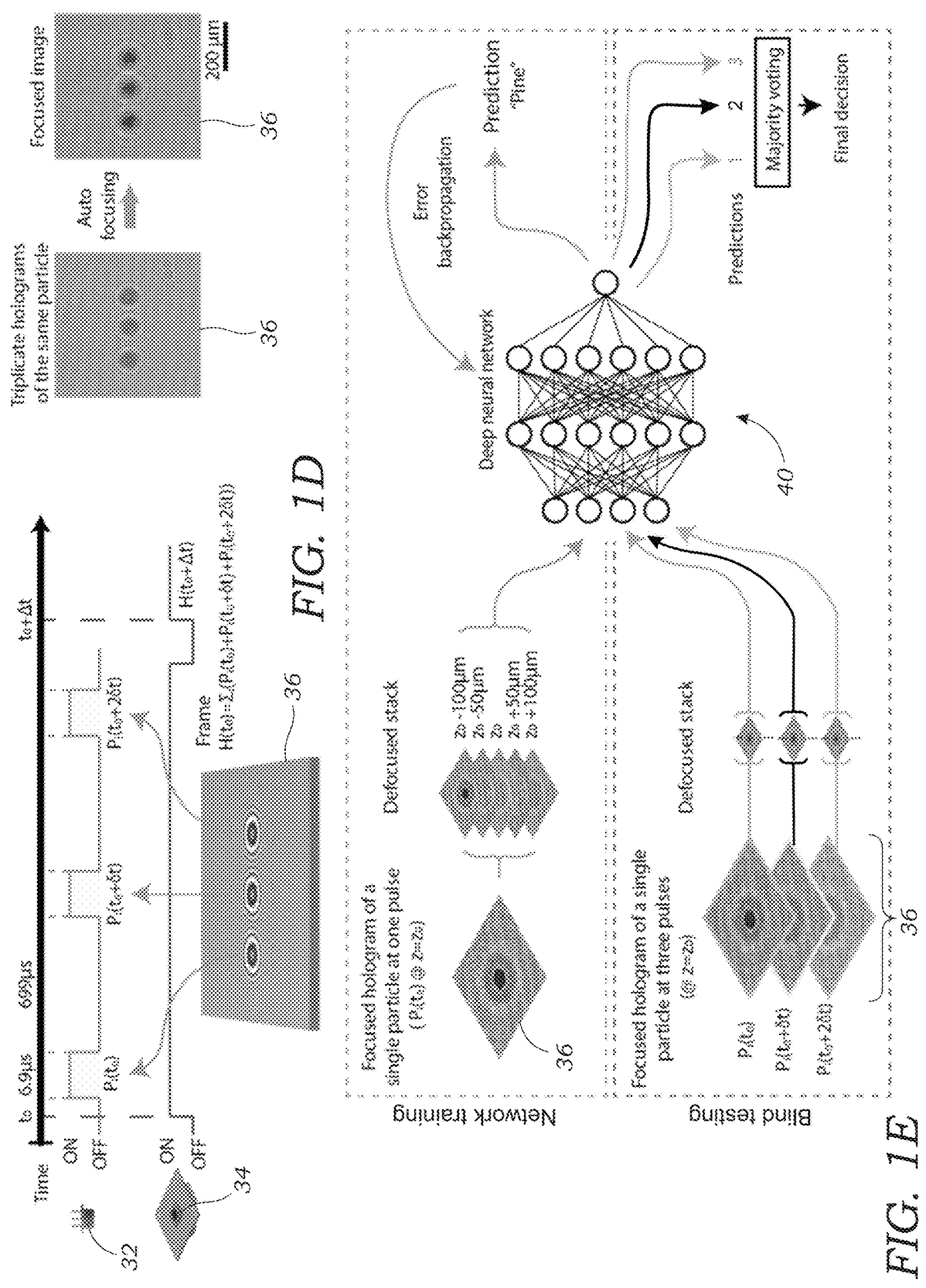
FIG. 1D illustrates the timing or workflow sequence of a single image frame of captured holographic images obtained in response to three pulses of the laser diode light source. The three pulses form a pulse train. Particles cast lens-free inline holograms on a CMOS image sensor with each pulse. Triplicate holographic patterns are digitally integrated by the CMOS sensor on each frame.
FIG. 1E illustrates a deep neural network that was trained to classify pollen species. FOVs containing individual pollen particles were first auto-focused. The focused hologram was intentionally defocused (using angular spectrum method) for ±50 and ±100 μm in the axial direction. Both the real and imaginary channels of the focused and defocused holograms formed an image stack to train the neural network. In the blind testing stage, a majority voting scheme was applied to the labels inferred using the triplicate holographic patterns of each flowing particle.
Figure 2C:
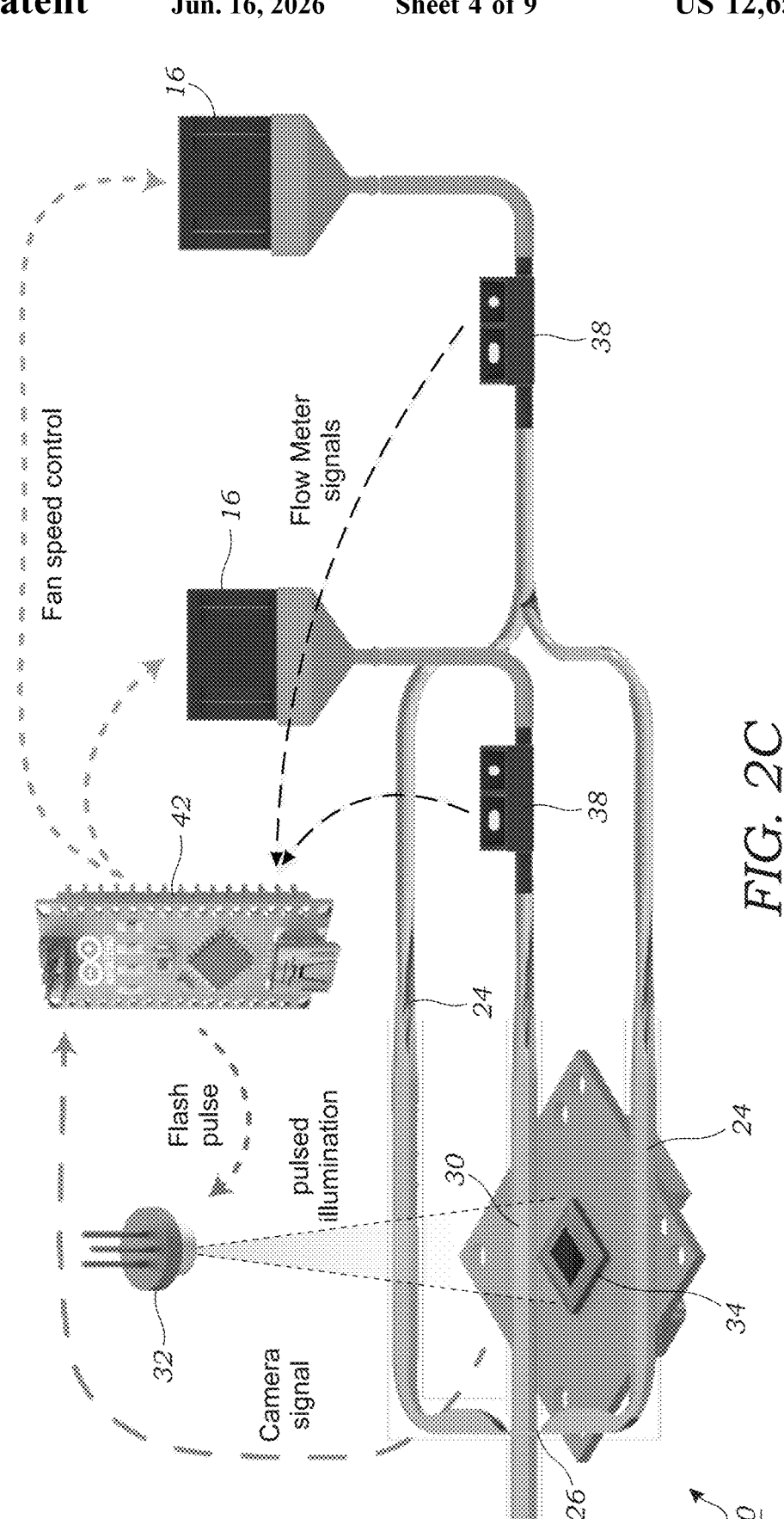
FIG. 2C schematically illustrates the control circuit or microcontroller used to control aspects of the particulate matter detection device. The control circuit or microcontroller fires a pulse train and receives the signal from the CMOS image sensor. The circuit or microcontroller also measures the flow rate inside the virtual impactor channels (e.g., main channel and combined return channel of bypass channels) and uses it to adjust the fan power using a PID controller.
Figure 8:
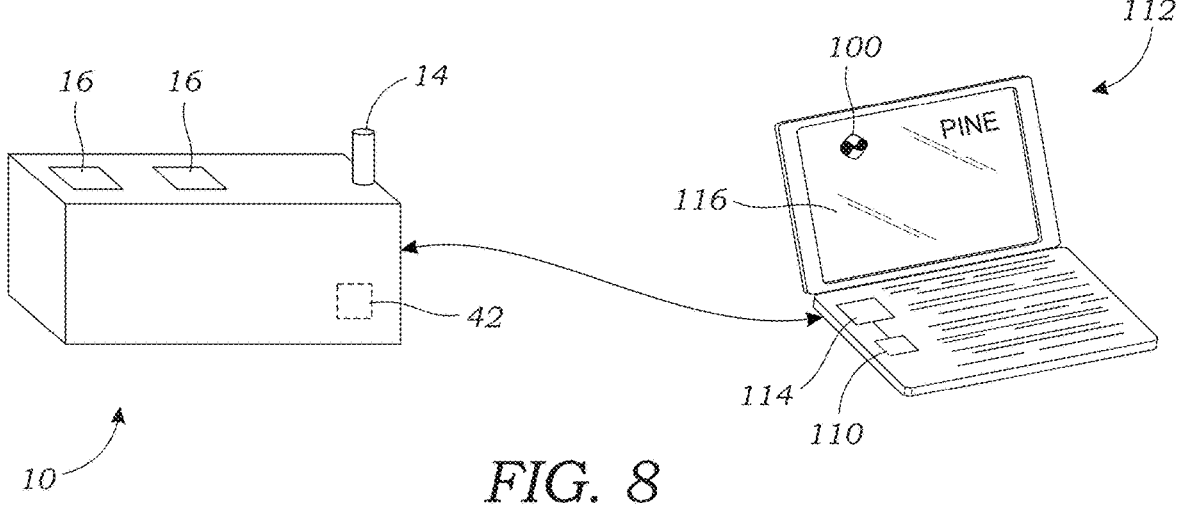
FIG. 8 illustrates a computing device connected to the particular matter detection device. The computing device is a laptop and includes a display with a graphical user interface (GUI) that is used by the user to display results and adjust operating parameters of the device.

As seen in FIG. 2C, the first and second bypass channels 44 rejoin downstream at a common channel 28. The dimensions and flow rates through the main channel 22 and the first and second bypass channels 24 are constructed so that particles 100 of interest (e.g., based on size) travel through the main channel 22. With reference to FIGS. 1B and 1C, the main channel 22 includes in a region thereof downstream of the junction 26 an optically transparent imaging window 30. As explained below, the imaging window 30 is optically transparent and permits a pulsed light source 32 located on one side thereof to illuminate the particles 100 as they pass through the imaging window 30 (FIG. 1C). The pulsed light source 32 may include a pulsed laser diode or a pulsed light emitting diode (LED). The particles 100 in the main channel 22 within the imaging window 30 cast holograms that are captured by an image sensor 34 (e.g., CMOS image sensor) located on an opposing side of the imaging window 30. The image sensor 34 generates a holographic image frame 36 that contains one or more holograms cast by the particles 100 at different times that correspond to the pulses of the light source 32. In some embodiments, when a single pulse is used, only a single hologram for that particular particle 100 is captured by the image sensor 34. As the particles 100 move within the main channel, the holograms that are cast move as well and are captured in the image frame 36 obtained by the image sensor 34. These captured raw holograms are then subject to a reconstruction/focusing operation through image processing software 110 that is executed on a computing device 112 (FIG. 8). The images containing the focused holograms, along with one or more intentionally defocused images (defocused using, for example, the angular spectrum approach or algorithm), are input to a trained neural network 40 configured to receive the images from the image sensor 34 and classify the particles 100 into one or more classes (FIG. 1E). As explained herein, the optional addition of defocused images in conjunction with the focused image provides for greater accuracy in results. It should be appreciated, however, that inputting the defocused images may be omitted in certain embodiments and only the focused images may be input to the trained neural network 40.

To provide airflow within the air sampler 12, the main channel 22 is operatively coupled to a first fan 16 located at a downstream location past the imaging window 30. In addition, the first bypass channel 24 and the second bypass channel 24 recombine at the common channel 28 which contains a second fan 16. Airflow may be provided within the air sampler 22 by other means such as pumps and the like. The air sampler 22 includes a first flow meter 38 configured to measure air flow in the main channel 22 and a second flow meter 38 configured to measure air flow in the first bypass channel 24 and the second bypass channel 24. These flow meters 38 are used to monitor the respective air flows in the main channel 22 and bypass channels 24, respectively. Different flow meters 38 may be used for the first and second flow meters 38 given that there are significantly different flow rates in the respective channels 22, 24. One or more microcontrollers 42, microcomputers, processors, or other control circuitry receive signals form the flow meters 38 for monitoring the flow speed through the main channel 22 and the first and second bypass channels 24. The one or more microcontrollers 42, microcomputers, processors, or other control circuitry also control the speed of the first and second fans 16 (or other airflow devices). In this manner, feedback signals are communicated to the microcontroller 42 which can then make adjustments in the respective fan speeds of the first fan and/or second fan 16. The microcontroller 42 also communicates with the image sensor 34 and light source 32 or associated driving circuitry to synchronize illumination and image capture of the particles 100.

Figures 6A, 6B:
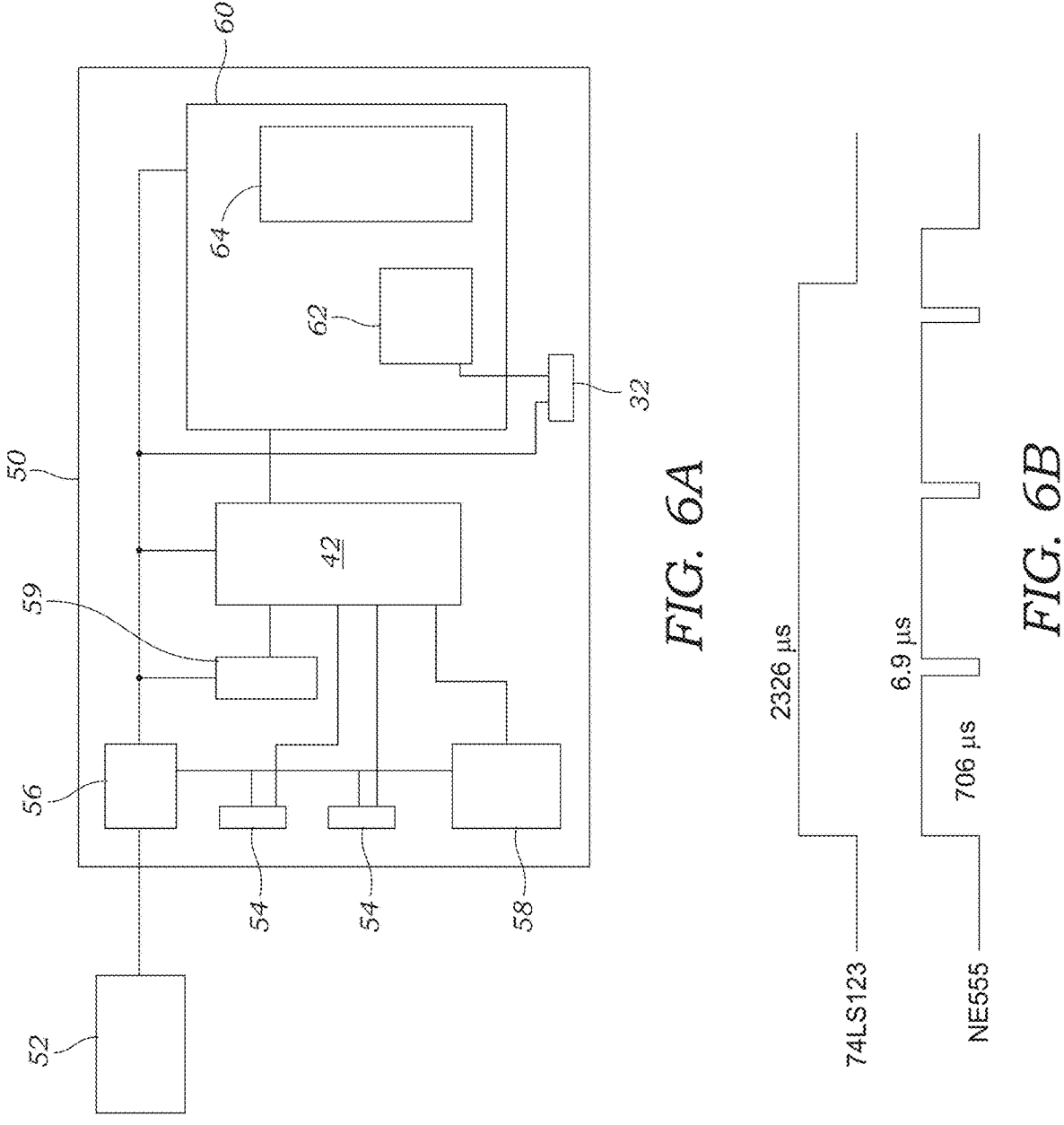
FIG. 6A illustrates a schematic of the control circuit that is used to operate the various components of the device.
FIG. 6B illustrates a diagram outlining the pulse train generation according to one embodiment.

The electronics used to control and operate the particulate matter particle detection device 10 are mounted on a printed circuit board (PCB) 50 (illustrated in FIG. 6A). The microcontroller 42 (e.g., Arduino) is located on the PCB 50. The electronics are powered by a 12 V power supply 52 which supplies power to fans 16 via connectors 54. The 12 V power supply 52 also provides power to one of the flow meters 38 via interface 58. A DC-DC power converter 56 provides ~5.4 V power to the remaining electronics. This includes providing power to a second flow meter 38 via interface 59 on the PCB 50, the microcontroller 42, and pulse generator circuitry 60 which is used to drive the pulsed light source 32 (e.g., laser diode). The pulse generator circuitry 60 that is used to drive the pulsed light source 32 includes a LED controller 62 which provides a constant current source that is used to power the laser diode 32. The pulse generator circuitry 60 includes a square wave generator 64. The square wave triggers the LED controller 62 when the square wave is on high voltage which delivers current to the laser diode 32. To ensure that the laser diode 32 is only triggered when the image sensor 34 is on, the pulse generator circuitry 60 includes a 74LS123 chip that generates a pulse that is triggered when the all the pixels of the CMOS image sensor 34 are enabled. The pulse from the 74LS123 chip then enable a 555 chip to generate a pulse train that passes first through an OR gate to the TLC5916 chip used in the LED controller 62 to pulse the laser diode 32.

With reference to FIG. 8, a separate computing device 112 (e.g., laptop, desktop, tablet, server, mobile phone, or the like) may be connected to the particulate manner detection device 10 via the microcontroller 42 and can be used to alter or adjust operational parameters of the particulate matter detection device 10. For example, a graphical user interface (GUI) 116 may be displayed on a display associated with the computing device 112 (local or remote) and can be used to adjust or control imaging parameters of the image sensor 34. In one embodiment, holographic videos are obtained by the image sensor 34 at a frame rate of several frames per second. The GUI 116 may also display images of the particles 100 along with details regarding the same such as the class or type of the particles 100. This may include particle number, particle type or class (or other details). As explained herein, in one embodiment, a trained neural network 40 is provided that is executed using, for example, the separate computing device 112 to classify the particles 100 based on the obtained images. The class may include the type of particle or the particular origin or species of the particle (e.g., pine pollen). The trained neural network 40 may be executed using image processing software 110 or separate software executed by one or more processors 114 on the separate computing device 112 that contains the GUI 116 for controlling the operational parameters of the particulate matter detection device 10. Alternatively, the trained neural network 40 may run on a remote computing device 112 (e.g., a server). In this embodiment, the focused and defocused images may be transferred to a remote computer 112 that determines the class of particles 100 that are detected. These results may then be communicated electronically (e.g., over a wide area network such as the Internet) back to either a local computer device 112 or the particle detection device 10.

Experimental Results

Portable Bio-Aerosol Sampling Device Using a Virtual Impactor

The portable particulate matter detection device 10 designed to sample and image particulate matter (i.e., particles 100) such as bio-aerosols contains three major parts: a virtual impactor 20 that collects and slows down the flowing pollen particles 100 in the main channel 22, a lens-free holographic imaging system that includes a pulsed light source 32 and an image sensor 34 for capturing microscopic images of particles 100 (e.g., pollens), and a control circuit or microcontroller 42 that automates the entire workflow. The virtual impactor 20) contains one main channel 22 with a designed flow rate of 10 mL/min, and two symmetrical bypass channels 24 with a total flow rate of 1 L/min. The physical dimensions of the virtual impactor 20 were optimized by finite element method (FEM) simulations using COMSOL (FIGS. 2A and 2B). Input aerosol particles 100 larger than 6.3 $\mu$m (cut-off diameter) have more than 50% probability of entering the virtual impactor 20 through the main channel 22, while other smaller particles 100 leave via bypass channels 24 (FIG. 2C). Based on this, the pollen particles 100 to be detected and classified are concentrated in the main channel 22, where the flow rate is ~100 times smaller than the input flow rate. Consequently, each pollen type of interest has a significantly higher concentration inside the main channel 22 than in ambient air. Two fans 16 are used to power the flow inside the main channel 22 and bypass channels 24 independently, whose flow rates are monitored by two separate flow meters 38. The real-time signals are sent to an Arduino microcontroller 42, where a simple PID feedback loop was implemented to adjust the speed of the fans 16 (see FIG. 2C and FIG. 6A).

An imaging window 30 with a volume of 5×5×1 mm$^3$ is opened at the center of the main channel 22 (FIG. 2B), sealed by coverslip glasses. A CMOS image sensor 34 to capture the lens-free holograms of the particles 100 flowing over the imaging window 30 was placed next to the main channel 22, touching the coverslip glass. The axial distance from the bottom of the main channel 22 to the CMOS sensor 34 is ~1.5 mm. A customized Graphical User Interface (GUI) 116 (FIG. 8) was designed to control the CMOS imager 34 and take holographic videos at a frame rate of 3.5 fps. If continuous wave (CW) illumination were to be used to form holograms, the high speed of the concentrated particles (~0.17 m/s) would normally introduce a strong motion blur and rolling shutter artifacts. To capture motion blur-free and undistorted holograms, the imaging system was configured to mimic strobe photography (FIG. 1D). When all the pixels of the CMOS image sensor 34 are turned on to collect photons, a signal was sent to a customized pulse generation circuit, firing a train of three successive pulses using a laser diode as the pulsed light source 32 (1=515 nm) that shines through the imaging window 30. Under each laser pulse, all the flowing particles 100 above the imaging window 30 form their holograms captured by the CMOS image sensor 34. The pulse duration was short enough (6.9 μs) to avoid motion blur for each holographic pattern. The particles 100 travel along the flow direction during the interval between two pulses (δt=699 μs). As a result, after the pulse train, three individual holograms were acquired by the CMOS image sensor 34, through a single frame 36 with triplicate holographic patterns for each pollen particle 100 flowing inside the main channel 22 (e.g., FIG. 1D). Each captured hologram was transferred into the controlling laptop 112 for further processing. The entire mobile device 10 has dimensions of 24.1 cm×10.5 cm×10.2 cm and weighs ~700 g. The components of the prototype cost ~$923 to build, and its detailed list can be found in Table 1.

TABLE 1

| Components | Cost ($) |
| --- | --- |
| 515 nm laser diode | $ 15.36 |
| IDS-UI-3592LE-C-VU CMOS sensor | $608.00 |
| AWM3100V flow meter | $111.00 |
| FS2012 flow meter | $ 41.25 |
| 9GA0312P3K0011 DC fan | $ 15.34 |
| 9CRB0412P5S201 DC fan | $ 30.09 |
| Customized PCB board | $ 20.00 |
| AC/DC wall mount adaptor | $ 16.87 |
| Arduino Nano Every | $ 11.85 |
| TLC5916 LED driver | $  1.36 |
| Mechanical supporting parts | $  2.00 |
| 3D printing material | $ 50.00 |
| Total | $923.12 |

Table 1. Purchase costs of the components used in the mobile particulate matter sensor prototype.

Label-Free Bio-Aerosol Imaging and Classification

Aerosol particles 100 containing six different types of pollens were targeted. This included bermuda, elm, oak, pine, sycamore, and wheat. Purified aerosols containing only a single pollen type were generated using a customized particle generator that directly connects to the device 10. In each measurement, the CMOS image sensor 34 was configured to take sixty frames 36 of time-lapse holographic images. Fifty different measurements were conducted on each type of pollen within a period of a month, without any need to replace the virtual impactor 20. This capability to conduct long-time experiments is a unique feature enabled by the virtual impactor 20, which does not immobilize the particles 100 or create contamination on the imaging window 30.

Figure 3:
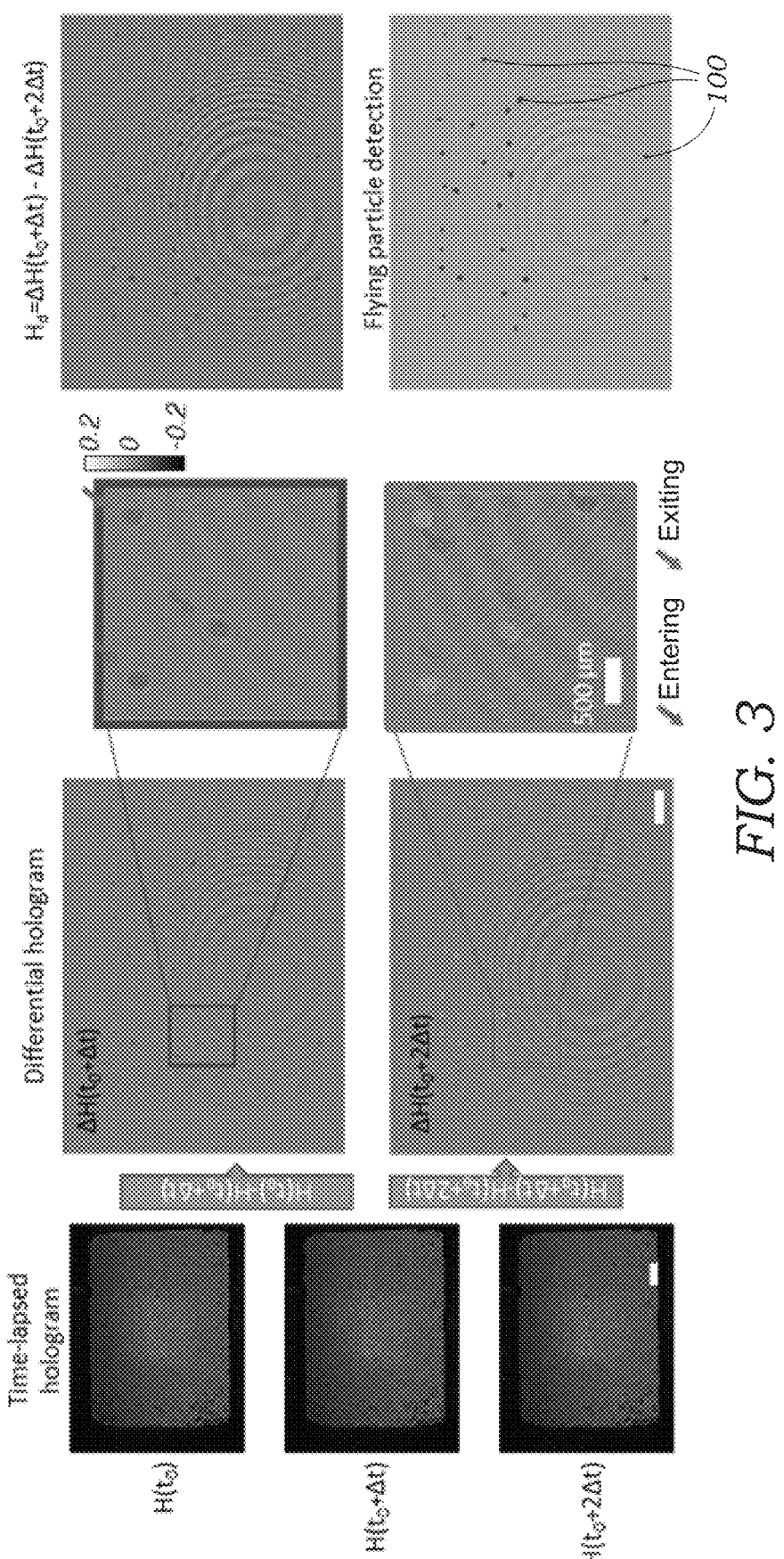
FIG. 3 illustrates flowing particle detection and localization using differential holograms. Differential holograms (see Eq. 1) were calculated using three successive holograms $H(t_0)$, $H(t_0+\Delta t)$ and $H(t_0+2\Delta t)$. Note that $\Delta t=285.7$ ms and should not be confused with $\delta t=699$ us which is the interval between two successive pulses. One of these holographic images contains the entire triplicate hologram set of a flowing particle within the imaging window. Flying particles present lower intensity levels in the differential hologram Ha and a threshold was used to localize the flowing particles.

These time-lapse holographic images monitor the particles 100 passing through the imaging window 30 above the image sensor 34. Flying particulate matter can be easily identified from the time-lapse holograms captured by the portable device 10 (FIG. 3); without loss of generality, the triplicate holographic patterns of a flowing particle 100 of interest appear in the second frame 36 of any consecutive three-frame holograms: $H(t_0)$, $H(t_0+\Delta t)$ and $H(t_0+2\Delta t)$. A differential hologram Ha can be calculated from these three successive CMOS frames (FIG. 3), i.e., $$H_d = 2H(t_0 + \Delta t) - (H(t_0 + 2\Delta t) + H(t_0)). \qquad (1)$$

Note that $\Delta t$=285.7 ms and should not be confused with the interval between two successive pulses ($\delta t$=699 μs); the latter creates multiple holograms of each flowing particle 100 on a single lens-free image frame 36, whereas $\Delta t$ is determined by the frame rate of the CMOS imager 34 (3.5 fps). After this differential calculation, the flying particles 100 of interest that only appear in the frame $H(t_0+\Delta t)$ present a lower intensity level compared to the background. A threshold was applied to Ha for localizing each flowing particle 100, and the resulting image patches with the detected particles 100 were cropped, each with a size of 256×256 pixels.

Figure 4:
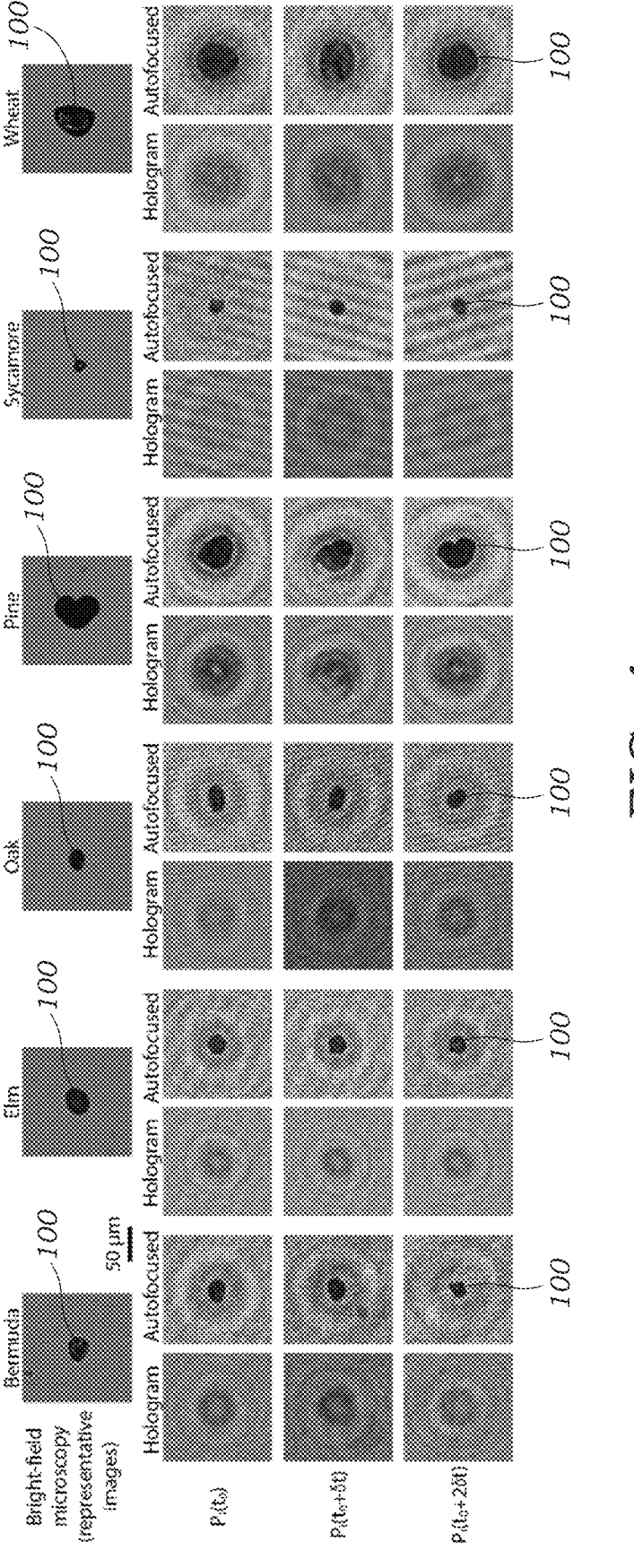
FIG. 4 illustrates triplicate holographic patterns of the same flowing particles under pulsed illumination; each pulse duration is 6.9 $\mu$s and $\delta t=699$ $\mu$s. Top row: a representative pollen particle of each species imaged under a bright-field microscope. Bottom three rows: triplicate holographic patterns of a different pollen particle of each species captured during the experiments with their respective autofocused images shown to the right of the corresponding lens-free hologram.

The microscopic image of the flowing pollen particle 100 in each region of interest (ROI) was reconstructed by digitally propagating the raw hologram using the angular spectrum method to its focal plane, estimated by an auto-focusing algorithm such as that disclosed in Zhang, Y. et al., Edge Sparsity Criterion for Robust Holographic Autofocusing. Opt. Lett., OL 2017, 42 (19), 3824-3827, which is incorporated by reference herein. For all the six pollen species used here, the raw triplicate holograms of some representative particles 100 and their back-propagated images are illustrated in FIG. 4. The back-propagated holograms of each pollen, without any motion blur or rolling shutter artifact, showed a good reconstruction fidelity. Importantly, the three holographic replicas of the same particle 100 were not identical, which indicates that the particles have free rotation while flowing within the air stream. These images of each pollen from different perspectives provided richer information about the pollen particle 100, which proved important for more accurate classification of their type, as explained below.

Figures 5A, 5B:
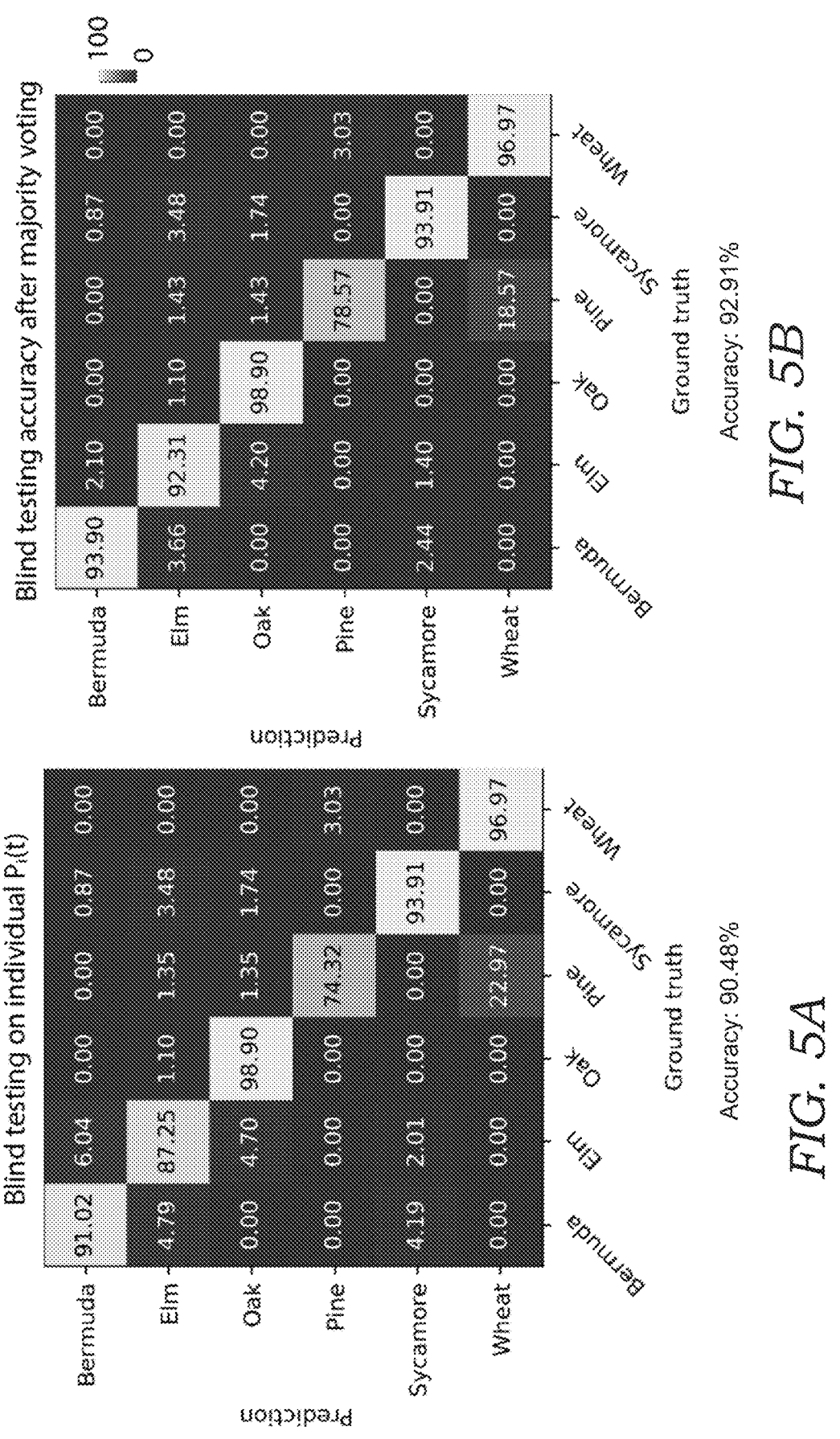
FIGS. 5A and 5B illustrate the confusion matrices of the trained classification deep neural network. In the blind testing stage, each image FOV is separately/individually classified, ignoring triplicate holograms of each flowing particle (FIG. 5A). A majority voting was then applied to the three labels predicted by using the triplicate holographic patterns of each flowing particle. The final classification accuracy with majority voting improved to 92.91% as seen in FIG. 5B.

An image dataset was established from the experimental data captured using the device 10, containing ~6000 ROIs for training and validation, and ~900 ROIs for blind testing. A deep neural network 40 based on DenseNet201 was trained to classify the type of pollen particles 100. During the training, the network 40 treated each ROI as an independent particle 100. In other words, the relation between the holographic replicas of each flowing particle 100 was intentionally ignored to increase the robustness of the classification system. To utilize the volumetric information provided by lens-free holographic imaging, the network 40 was trained with both the real and imaginary channels of each ROI propagated to five axial locations: its focus plane and 50 μm and 100 μm above and below the focus plane. After the training phase, the deep neural network 40 achieved a blind testing accuracy of 90.48% in classifying all the individual ROIs containing six (6) different types of pollen. The corresponding confusion matrix is displayed in FIG. 5A. Using the additional information (with different perspectives of the pollen) available in triplicate holographic images of each flowing particle 100 helps improve the final classification accuracy. The ROIs belonging to the same particle 100 were first located and grouped together. To utilize this additional source of information, a majority voting scheme was used and applied to the labels of the three successive ROIs (corresponding to three holographic replicas of the same particle 100), which were independently classified using the same trained network 40. The voting winner (with 2 or more votes) was selected as the final predicted label (pollen type) for all three replicas of each flowing pollen particle 100, which increased the blind testing accuracy to 92.91% (see the confusion matrix in FIG. 5B).

DISCUSSION

Figure 7:
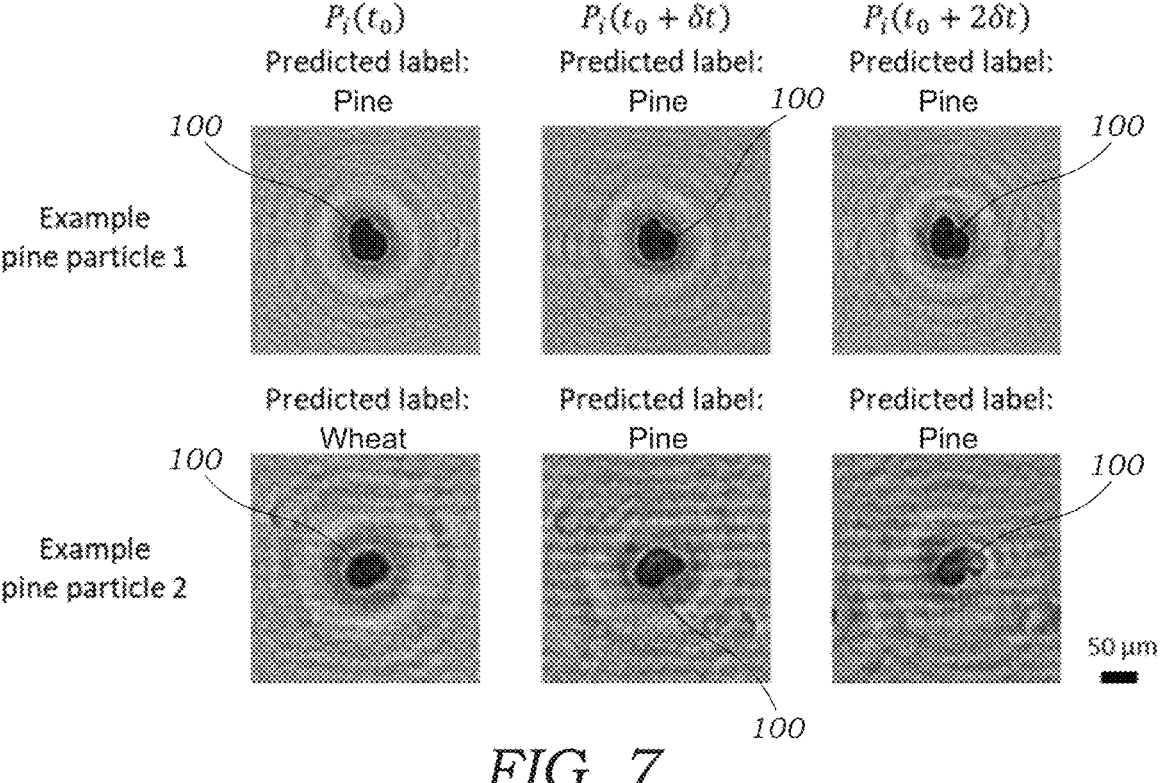
FIG. 7 illustrates examples of pine pollen image fields-of-view and the deep neural network classification results. The particle in the second row was correctly classified as pine after the majority voting scheme was used (2 pine and 1 wheat).

The particulate matter detection device 10 that uses a plurality (e.g., triplicate) of holographic images has a unique advantage since it permits the visualization of the same particle 100 from different perspectives during its flow within the virtual impactor 20. The impact of this capability can be better seen in the classification of pine pollen particles 100. In general, pine pollens have a unique feature with wing-like bladders (see the fourth column in FIG. 4 as an example). During the flow of such a particle 100 inside the main channel 22, there is a chance that the captured hologram of a pine pollen particle 100 only reflects its main body, with the bladders hidden behind it, which makes it resemble a wheat pollen of similar size (see FIG. 7 as an example). In fact, because of this, the trained neural network 40 misclassified 22.97% of pine pollens as wheat using a single holographic image. The classification accuracy of pine pollens was improved using the triplicate holographic images through a majority voting process, reducing the error rate to 18.57%. Furthermore, if one relaxes the voting rule for pine pollens such that all the particles in triplicate holographic images will be labeled as pine pollens if at least one of those holographic images was classified as pine, the error rate can further drop to 17.14%.

The designed particulate matter detection device 10 with lens-free holographic imaging also presents a unique feature of volumetric sensing of flowing particulate matter. It allows the imaging of flowing particles 100 distributed inside a large volume (25 mm³) and records the 3D information about the particles 100 through holography. Harvesting this 3D information, a trained neural network 40 is disclosed that utilizes the complex-valued images of each flowing particle 100 at five different axial locations, each of which has different phase and amplitude profiles, reflecting the unique 3D refractive index information of the particle 100. To shed additional light on the classification advantages brought by this volumetric sensing approach, another deep neural network 40 was trained taking only the auto-focused images, i.e., from a single axial location, while keeping the architecture and training parameters the same as before. This trained neural network 40 that only used the complex-valued object field from a single axial plane achieved a worse classification accuracy of 85.23%, which indicates the advantages of using multiple complex fields at different axial planes for each flowing particle 100.

Generally, the quality of an inline holographic image after a simple auto-focusing step suffers from the twin-image artifact unless phase recovery is applied to it. Here, however, since the distance between the particles 100 and the CMOS image sensor 34 is relatively large (on average ~2 mm), phase retrieval was not used and the twin image artifact did not constitute an obstacle to the accurate classification of pollen particles 100. If a clearer microscopic image of each flowing particle 100 is desired, optionally, iterative or neural network-based phase recovery algorithms can be used to remove the twin-image artifacts, revealing increased contrast and SNR for each particle 100. In addition, deep neural networks 40 can also be used for auto-focusing and phase recovery at the same time. The inclusion of these additional processing steps might further improve the performance of the virtual impactor-based label-free bio-aerosol detection and classification device 10.

A particulate matter detection device 10 is disclosed herein that uses a virtual impactor 20 and computational imaging. Pollen particles 100 in the air were slowed down and concentrated in the main channel 22 of a virtual impactor 20. Pulsed illumination was used to form triplicate holographic patterns of the same particle 10 on a single image frame 36 captured by the image sensor 34. The volumetric sensing provided by holographic multi-shot imaging of the same flowing particle 100 brought unique features to this device 10, using which a deep neural network 40 achieved 92.91% accuracy in classifying different types of pollens. The mobile device prototype costs ~$920 and weighs ~700 g, which can be further reduced in mass production, providing a cost-effective and portable solution to long-term unattended personalized bio-aerosol monitoring.

Methods

Virtual Impactor Design and Fabrication

The cut-off diameter $d_{50}$ of a virtual impactor 20 can be estimated using the flow velocity and the virtual impactor geometry:

$$d_{50} = \sqrt{\frac{9\eta W^2 L(Stk_{50})}{\rho_p Q}} - 0.0078 \times 10^{-6} \tag{2}$$

where $\eta$ is the air viscosity. W and L denote the width and length of the impaction nozzle (the junction of the main channel 22 and bypass channels 24). $Stk_{50}$ is the Stokes number of the particles 100 with 50% collection efficiency, $\rho_p$ is the density of the particle 100, and Q is the flow rate. In designing the virtual impactor 20, the flow rate Q was first empirically chosen, and the dimension of the virtual impactor nozzle was optimized using the FEM solver in COMSOL (see FIG. 2A). The channels 22, 24 of the virtual impactor 20 were fabricated using a 3D printer (Objet30 Pro, Stratasys Inc.) with a light-blocking material. The region designed for the imaging window 30 was fabricated as open holes during the 3D printing. Coverslip glasses were used to seal them and form an air-tight channel.

Camera Exposure Settings and Illumination Pulse Synchronization

The CMOS image sensor 34 (IDS-UI-3592LE-C-VU, 4912×3684 pixels, pixel pitch 1.25 µm) used operates based on a rolling shutter with a global release feature. The camera sequentially turns on all 4912 rows of pixels to start collecting photons, from top to bottom, and sequentially turns them off. The time between the bottom row of the pixels to start detecting photons and the top row to stop detecting photons was set to be 2600 µs. In other words, all pixels on the CMOS image sensor 34 collect photons during this 2600 µs period. A high voltage level is provided when all pixels are turned on. This signal triggers a single pulse with a duration of 1600 µs from a re-triggerable monostable multivibrator (74LS123, Texas Instrument Inc.). This single pulse is further coupled with a pulse train generated by a 555 timer (LMC555CN, Texas Instrument Inc.) with a pulse width of 6.9 µs and a period of 707 µs (FIG. 6B). Three pulses (each having 6.9 µs) are generated and sent to an LED controller (TLC5917, Texas Instrument Inc.), which injects 120 mA current into the laser diode light source 32 (PLT5 510, OSRAM Opto Semiconductors GmbH).

Neural Network Training

The trained neural network 40 that was used was adapted from DenseNet201, with the channel number of the first convolutional layer tuned to match the input image channels. In the network training, each ROI was first randomly cropped to have a size of 224×224 pixels. Data augmentation, including random flipping and rotation, was consequently applied to the images. Finally, before being fed into the networks 40, each input image was processed with a Gaussian blur to remove salt and pepper noise caused by the short exposure under each pulsed illumination (6.9 μs). A softmax cross entropy loss was calculated using the network predicted class scores and the ground truth pollen species as:

$$\mathcal{L}_I = -\sum\nolimits_{c=1}^{6} g_c \cdot \log\left(\frac{\exp(s_c)}{\sum\nolimits_{c'=1}^{6} \exp(s_{c'})}\right), \quad (3)$$

where $s_c$ denotes the predicted class score for the $c^{th}$ class, and $g_c$ denotes the $c^{th}$ entry of the ground truth label vector. The network parameters were optimized using an Adam optimizer, with the learning rate set to be $1\times10^{-4}$ at the beginning and tuned using a cosine annealing schedule. The neural network 40 was trained using a desktop computer with a Ryzen 9 3950X central processing unit (AMD Inc.) and an RTX 2080Ti graphic processing unit (GPU, NVidia Inc.) with 64 GB of memory, running on Windows 10 (Microsoft Inc.). The typical training time with 200 epochs is ~5 hours.

While embodiments of the present invention have been shown and described, various modifications may be made without departing from the scope of the present invention. While the particulate matter detection device 10 has largely been described using a plurality of light pulses to capture holograms of particles 100 at different times and locations it should be appreciated that only a single pulse may be needed in some embodiments. In addition, while the particular experimental embodiment of the particulate matter detection device 10 utilized two bypass channels 24 other numbers of bypass channels 24 may be used. In addition, the fans 16 may be substituted with other air pumping/driving devices. The invention, therefore, should not be limited, except to the following claims, and their equivalents.

What is claimed is:
1. A particulate matter detection device comprising:
an air sampler having an inlet for receiving air having particles therein and comprising a virtual impactor comprising a main channel intersecting with one or more bypass channels, wherein the main channel comprises an optically transparent imaging window;
a pulsed light source disposed on a first side of the imaging window;
an image sensor disposed on a second, opposing side of the imaging window; and
wherein the image sensor captures holographic image(s) of the particles passing through the imaging window, wherein each holographic image contains one or more holograms cast by the particles at different times in response to one or more pulse(s) of the light source.
2. The particulate matter detection device of claim 1, further comprising a computing device comprising image processing software configured to reconstruct the holographic image(s) into one or more focused image(s) and/or defocused image(s).
3. The particulate matter detection device of claim 2, further comprising a trained neural network configured to receive the one or more focused image(s) and/or defocused image(s) and classify the particles into one or more classes.
4. The particulate matter detection device of claim 3, wherein the particles comprise mold, pollen, or microplastics and the classes corresponding to the particular type of mold, pollen, or microplastics.
5. A method of using the particulate matter detection device of claim 3, comprising:
pulling air having particles therein into the inlet of the air sampler;
capturing holographic image(s) of the particles passing through the imaging window; and
classifying the particles passing through the imaging window with the trained neural network.
6. The method of claim 5, further comprising displaying the classification result for the particles on a local or remote display associated with the computing device.
7. The method of claim 5, wherein the classification comprises a majority voting scheme based on the classification of each of the holograms cast by the particles at different pulses of the light source.
8. The particulate matter detection device of claim 2, wherein the computing device further includes a display with a graphical user interface (GUI) configured to control one or more of: air flow rate, fan(s), flow meter(s), the pulsed light source, and the image sensor.
9. The particulate matter detection device of claim 2, wherein the image processing software comprises an autofocusing algorithm and/or a trained neural network that reconstructs the holographic image(s) into one or more focused image(s).
10. The particulate matter detection device of claim 1, wherein the main channel is operatively coupled to a first fan and the one or more bypass channels is/are operatively coupled at least one other fan.
11. The particulate matter detection device of claim 10, further comprising a first flow meter configured to measure air flow in the main channel and at least one other flow meter configured to measure air flow in the one or more bypass channels.
12. The particulate matter detection device of claim 11, further comprising at least one microcontroller operatively connected to the fan(s), the flow meter(s), and the image sensor.
13. The particulate matter detection device of claim 1, wherein each holographic image contains a plurality of holograms cast by the particles from a plurality of pulses of the light source.
14. The particulate matter detection device of claim 1, wherein the pulsed light source comprises a pulsed laser diode or a pulsed light emitting diode (LED).
15. The particulate matter detection device of claim 1, wherein the imaging window has a sensing volume of ≥20 mm³.
16. The particulate matter detection device of claim 1, wherein the image sensor is located >1 mm from a bottom of the main channel.
17. A method of classifying particulate matter particles in air comprising:
flowing the air containing particles into an air sampler having an inlet and comprising a virtual impactor comprising a main channel intersecting with one or more bypass channels, wherein the main channel comprises an optically transparent imaging window;

capturing holographic image(s) of the particles passing through the imaging window in the main channel with an image sensor disposed adjacent to the imaging window, wherein each holographic image contains one or more holograms cast by the particles at different times in response to pulses of light from a pulsed light source;

reconstructing the holographic image(s) into corresponding focused image(s) with image processing software; and inputting the focused image(s) to a trained neural network configured to classify the particulate matter particles passing through the imaging window into one or more classes.

18. The method of claim 17, further comprising generating defocused images of the particulate matter particles with the image processing software and wherein the defocused images are input to the trained neural network along with the focused image(s).

19. The method of claim 17, wherein the particulate matter particles comprise mold, pollen, or microplastics and the classes corresponding to the particular type of mold, pollen, or microplastics.

20. The method of claim 17, wherein the trained neural network is configured to receive the focused image(s) as well as a plurality of defocused images and classify the particulate matter particles into one or more classes.

21. The method of claim 17, wherein the image processing software comprises a trained neural network that reconstructs the holographic image(s) into one or more focused image(s) and/or defocused image(s).

* * * * *